United States Patent
Garg et al.

(10) Patent No.: US 10,433,013 B2
(45) Date of Patent: *Oct. 1, 2019

(54) DYNAMIC MANAGEMENT OF AUDIOVISUAL AND DATA COMMUNICATIONS

(71) Applicant: Comcast Cable Communications, LLC, Philadelphia, PA (US)

(72) Inventors: Amit Garg, Delran, NJ (US); Tom Brown, West Chester, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/845,804

(22) Filed: Dec. 18, 2017

(65) Prior Publication Data

US 2018/0338179 A1    Nov. 22, 2018

Related U.S. Application Data

(63) Continuation of application No. 14/067,630, filed on Oct. 30, 2013, now Pat. No. 9,877,076, which is a continuation of application No. 13/153,632, filed on Jun. 6, 2011, now Pat. No. 8,595,376.

(51) Int. Cl.
*H04N 21/462* (2011.01)
*H04L 12/18* (2006.01)
*H04N 21/61* (2011.01)

(52) U.S. Cl.
CPC ....... *H04N 21/4621* (2013.01); *H04L 12/185* (2013.01); *H04N 21/6168* (2013.01)

(58) Field of Classification Search
None
See application file for complete search history.

(56) References Cited

U.S. PATENT DOCUMENTS

| | | | |
|---|---|---|---|
| 6,308,328 B1 | 10/2001 | Bowcutt et al. | |
| 7,296,091 B1 | 11/2007 | Dutta et al. | |
| 7,373,416 B2 | 5/2008 | Kagan et al. | |
| 7,424,528 B2 | 9/2008 | Cherkasova et al. | |
| 8,447,876 B2 | 5/2013 | Verma et al. | |
| 9,336,233 B2* | 5/2016 | Chatley | G06F 3/0613 |
| 2002/0069420 A1 | 6/2002 | Russell et al. | |
| 2003/0210649 A1 | 11/2003 | Bondi | |
| 2003/0217360 A1 | 11/2003 | Gordon et al. | |
| 2005/0033858 A1 | 2/2005 | Swildens et al. | |
| 2006/0047845 A1 | 3/2006 | Whited et al. | |
| 2008/0071859 A1* | 3/2008 | Seed | H04L 67/1095 709/203 |

* cited by examiner

*Primary Examiner* — Jeffrey R Swearingen
(74) *Attorney, Agent, or Firm* — Banner & Witcoff, Ltd.

(57) ABSTRACT

A device, system and method are provided to dynamically manage bandwidth for audiovisual communications and content distribution. The device, system and method may include dynamic qualification of content or channels for distribution in accordance with one or more distribution models, such as a broadcast distribution model and a narrowcast distribution model (e.g., a multicast distribution model and/or a unicast distribution model). In some embodiments, the qualification may be based on demand as reflected in requests for, or access to, content from user terminals. In some embodiments, based on changes in demand for content, a requalification of the content in terms of one or more distribution models may take place.

20 Claims, 5 Drawing Sheets

DYNAMIC MANAGEMENT OF AUDIOVISUAL AND DATA COMMUNICATIONS

This application is a continuation of U.S. application Ser. No. 14/067,630, filed Oct. 30, 2013, issued Jan. 23, 2018 as U.S. Pat. No. 9,877,076, and entitled "Dynamic Management Of Audiovisual And Data Communications," which is a continuation of U.S. application Ser. No. 13/153,632, filed Jun. 6, 2011, issued Nov. 26, 2013 as U.S. Pat. No. 8,595,376, and entitled "Dynamic Management Of Audiovisual And Data Communications," the specifications for which are hereby incorporated by reference in their entirety as non-limiting example embodiments.

BACKGROUND

Field of the Disclosure

This disclosure relates to content provisioning, distribution, transmission, and delivery and, to a device, system and method to dynamically manage bandwidth for audiovisual and data communications.

Description of the Background

In a distribution network, numerous discrete, preassigned groups of users, typically referred to as population pools, may be served or have access to content. Each user may receive content that is received by all users, by users of multiple population pools, and may additionally receive, or have available for request, unique content available for use by that user, by a subset of users, or by one or certain population pools, at any given time.

Broadcast content, as would be understood to those skilled in the pertinent arts, is content that may be constantly transmitted or otherwise made available to many or all users.

Narrowcast content, such as content delivered via switched digital video (SDV) and video on demand (VOD) technologies, enables content and network providers to offer a wider variety of content and programming. In a SDV system, for example, unwatched or rarely watched content may be transmitted only into the population pool or pools, and/or only to the users, and/or only at the times, that the content is requested.

SUMMARY OF THE DISCLOSURE

In one aspect, the disclosure relates to a device, system and method to dynamically manage bandwidth for content distribution, such as audio, video, and/or data. The device, system and method may include dynamic qualification of content for distribution as broadcast content or narrowcast content (e.g., multicast and/or unicast content).

In another aspect, the device, system and method may include at least one broadcast server (e.g., any server configured to provide broadcast communications) having associated therewith at least one broadcast content lineup and at least two narrowcast servers (e.g., unicast servers) each having associated therewith at least one narrowcast content lineup. At least two population pools may accept popular content comprised of the broadcast lineup from the at least one broadcast server, and narrowcast content comprised of a respective one of the narrowcast lineups from one of the at least two narrowcast servers. At least one service manager may detect a number of viewers of at least one of the popular content and the narrowcast content. In some embodiments, upon the number of viewers meeting or falling below a predetermined threshold, the at least one service manager may qualify the popular content to the respective narrowcast lineup. In some embodiments, the at least one service manager may qualify the narrowcast content to the broadcast lineup.

In some embodiments, a service manager may comprise, for example, one or more servers. A broadcast server may comprise any suitable server known to those skilled in the pertinent arts. The narrowcast servers may comprise, for example, multicast and/or unicast servers. The narrowcast lineup may comprise, for example, a switched digital video lineup, or a video on demand lineup.

In some embodiments, a device, system and method may employ a one-to-one correspondence between requalified narrowcast content and requalified broadcast content, e.g., for each narrowcast content that is requalified, broadcast content may be correspondingly requalified. Thus, requalification may be dependent on a threshold number of viewers of either or both of narrowcast content and/or broadcast content. In some embodiments, a different ratio of correspondence (e.g., many-to-one or one-to-many) between the requalified narrowcast content and the requalified broadcast content may be used.

Other aspects of this disclosure may provide a device, system and method to dynamically manage bandwidth for audiovisual communications and content distribution.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings and in which like reference numerals refer to similar elements.

DETAILED DESCRIPTION

Various connections between elements are discussed in the following description. These connections are general and, unless specified otherwise, may be direct or indirect, wired or wireless, and this specification is not intended to be limiting in this respect.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

It is to be understood that the figures and descriptions have been simplified to illustrate elements that are relevant for a clear understanding, while eliminating, for the purpose of brevity, many other elements found in typical audiovisual content distribution networks, devices, systems and methodologies. Those of ordinary skill in the art will thus recognize that other elements and/or steps may be used in implementing this disclosure. However, because such elements and steps are well known in the art, a discussion of such elements and steps is not provided herein. The disclosure herein is directed to all such variations and modifications of such elements and methods known to those skilled in the art. Furthermore, the embodiments identified and illustrated herein are for illustrative purposes only, and are not meant to be exclusive or limited in their description.

Figure 1:
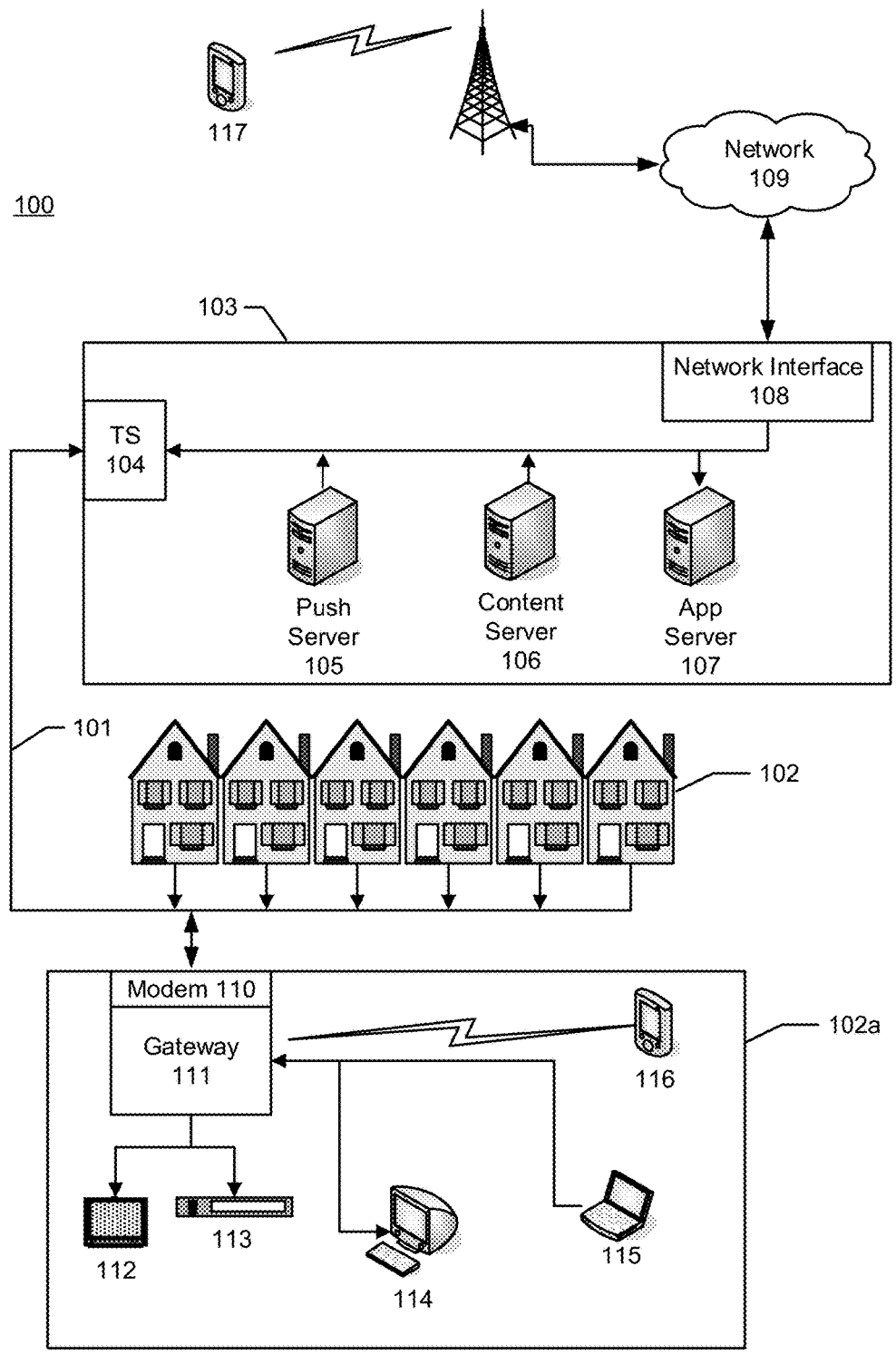
FIG. 1 illustrates an example information distribution network.

FIG. 1 illustrates an example distribution network 100 on which many of the various features described herein may be implemented. Network 100 may be any type of distribution network, such as satellite, telephone, cellular, wireless, etc. One example may be an optical fiber network, a coaxial cable network or a hybrid fiber/coax distribution network. Such networks 100 may use a series of interconnected communication lines 101 (e.g., coaxial cables, optical fibers, wireless, etc.) to connect multiple premises 102 (e.g., businesses, homes, consumer dwellings, etc.) to a central office or headend 103. The central office 103 may transmit downstream information signals onto the lines 101, and each premises 102 may have a receiver used to receive and process those signals.

There may be one line 101 originating from the central office 103, and it may be split a number of times to distribute the signal to various premises 102 in the vicinity (which may be many miles) of the central office 103. The lines 101 may include components not illustrated, such as splitters, filters, amplifiers, etc. to help convey the signal clearly, but in general each split may introduce a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a termination system (TS) 104, such as a cable modem termination system (CMTS), which may be a computing device configured to manage communications between devices on the network of lines 101 and backend devices such as servers 105-107 (to be discussed further below). The termination system (TS) may be as specified in a standard, such as the Data Over Cable Service Interface Specification (DOCSIS) standard, published by Cable Television Laboratories, Inc. (a.k.a. CableLabs), or it may be a similar or modified device instead. The termination system (TS) may be configured to place data on one or more downstream frequencies to be received by modems at the various premises 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various premises 102 in the network (or more specifically, to the devices in the premises 102 that are configured to detect such notifications). The central office 103 may also include a content server 106. The content server 106 may be one or more computing devices that may be configured to provide content to users in the premises 102. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide or interactive program guide listings. Another application server may be responsible for monitoring user viewing habits and collecting that information for use in selecting advertisements. Another application server may be responsible for formatting and inserting advertisements in a video stream being transmitted to the premises 102. Another application server may be responsible for receiving user remote control commands, and processing them to provide an intelligent remote control experience.

An example premises 102a may include a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in premises 102a to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the premises 102a, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
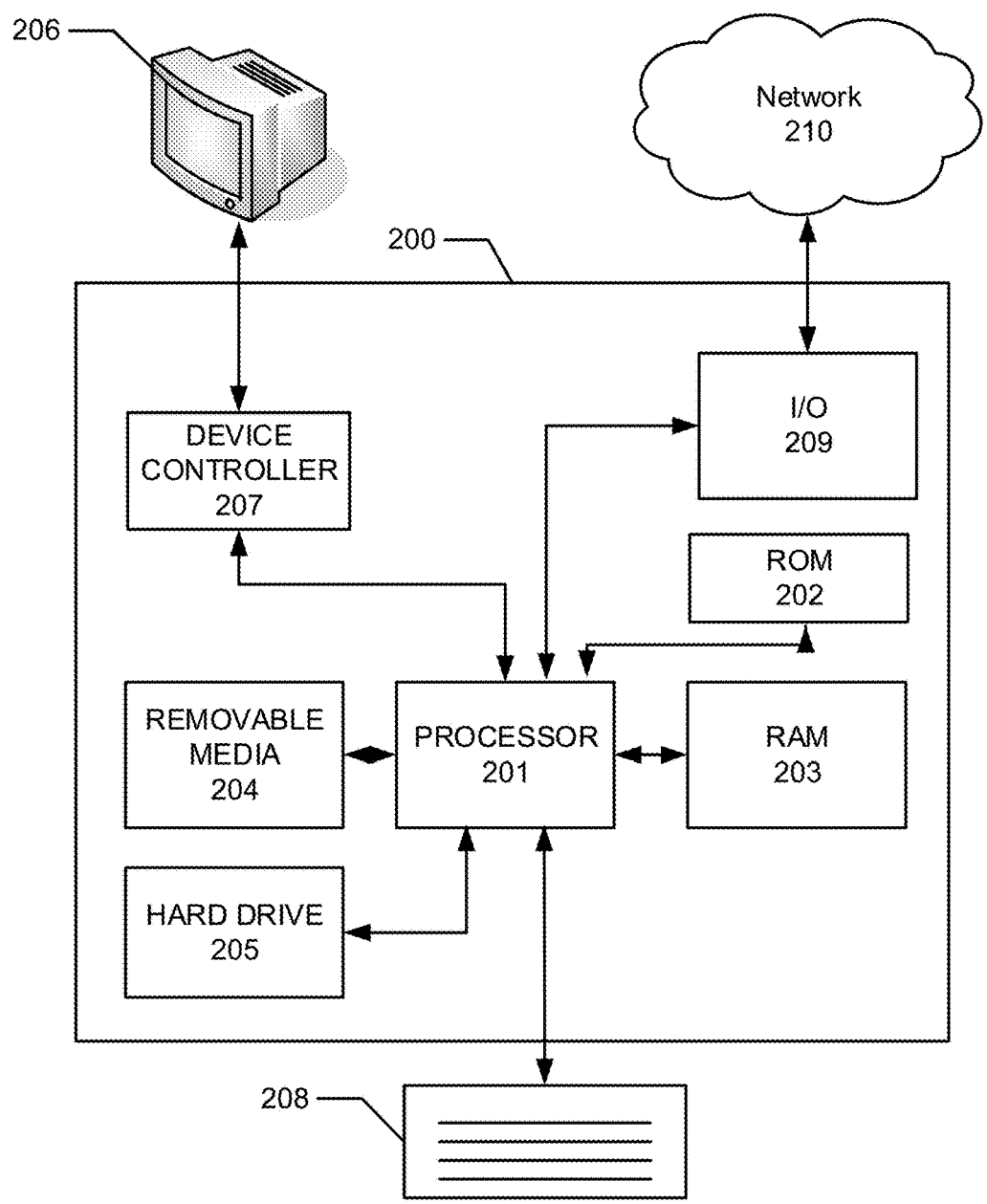
FIG. 2 illustrates an example hardware platform on which the various elements described herein can be implemented.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

Figure 3:
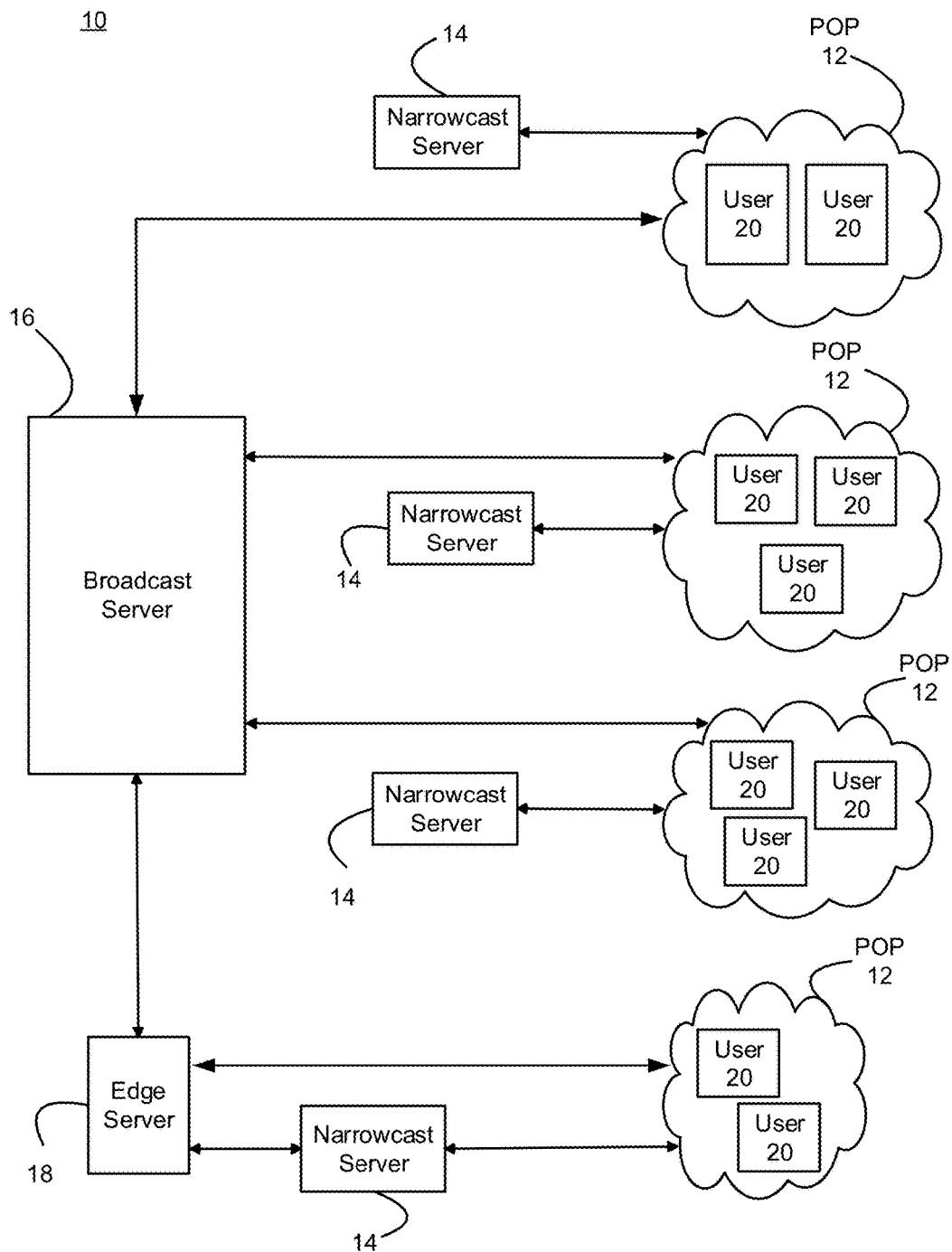
FIG. 3 is a block diagram illustrating aspects of a distribution network in accordance with one or more aspects of the disclosure.

FIG. 3 is a block diagram illustrating aspects of a network 10. In some embodiments, network 10 may include one or more of the devices described above in connection with FIGS. 1-2 and may be configured to distribute content. In some embodiments, network 10 may include a multi system operator (MSO) type network. The network 10 may include or serve one or more population pools (POPs) 12. Population pools 12 may be served by one or several narrowcast servers 14, one or more broadcast servers 16, and at least one edge server 18 corresponding to one or more of population pools 12, wherein each edge server 18 may serve a plurality of users 20. Each user 20 may use or correspond to, for example, one or more terminals, e.g., a computer, a STB, a mobile device, etc.

In network 10, each user 20 may have access to broadcast content and narrowcast content. A user may access the broadcast content from a single (or limited number of) broadcast server(s) 16 that serves one or more population pools 12, and may access the narrowcast content from the narrowcast server 14 serving the population pool 12 to which that user 20 is assigned. In some embodiments, the narrowcast and broadcast content may be available to a user 20 simultaneously. In some embodiments, the user 20 may request the narrowcast content in order to obtain access to that narrowcast content.

In some embodiments, a single broadcast server 16 may service one or more population pools 12. In some embodiments, the group of users and/or terminals forming each population pool 12 may be of a predetermined size, such as 25,000 terminals, for example. In some embodiments, the population pools 12 may be simultaneously served by one or a limited number of narrowcast servers 14, such as a group of 25 to 50 narrowcast servers, for example. Mainstream or popular content may be assigned, or qualified, to be served by the broadcast server(s) across one or more of the population pools in the network 10, and other, non-mainstream or less popular content may be assigned or qualified to be served by the narrowcast servers across one or more of the population pools.

In some embodiments, a narrowcast server 14 may service niche content, unicast or similar VOD content, SDV content, and/or other non-mainstream content, pursuant to the qualification of the content as non-mainstream. It follows that, in some embodiments, content not qualified as non-mainstream may be qualified as mainstream content, and thus as broadcast content.

Aspects of this disclosure include devices, systems and methods of dynamically tracking and qualifying content for service by either a broadcast server 16 and/or a narrowcast server 14. The devices, systems and methods for tracking and qualifying content may provide a dynamic assignment or qualification of content, such as channels, to broadcast servers 16 or narrowcast servers 14, such as based on the real time persistence of content across one or more population pools 12.

Figure 4:
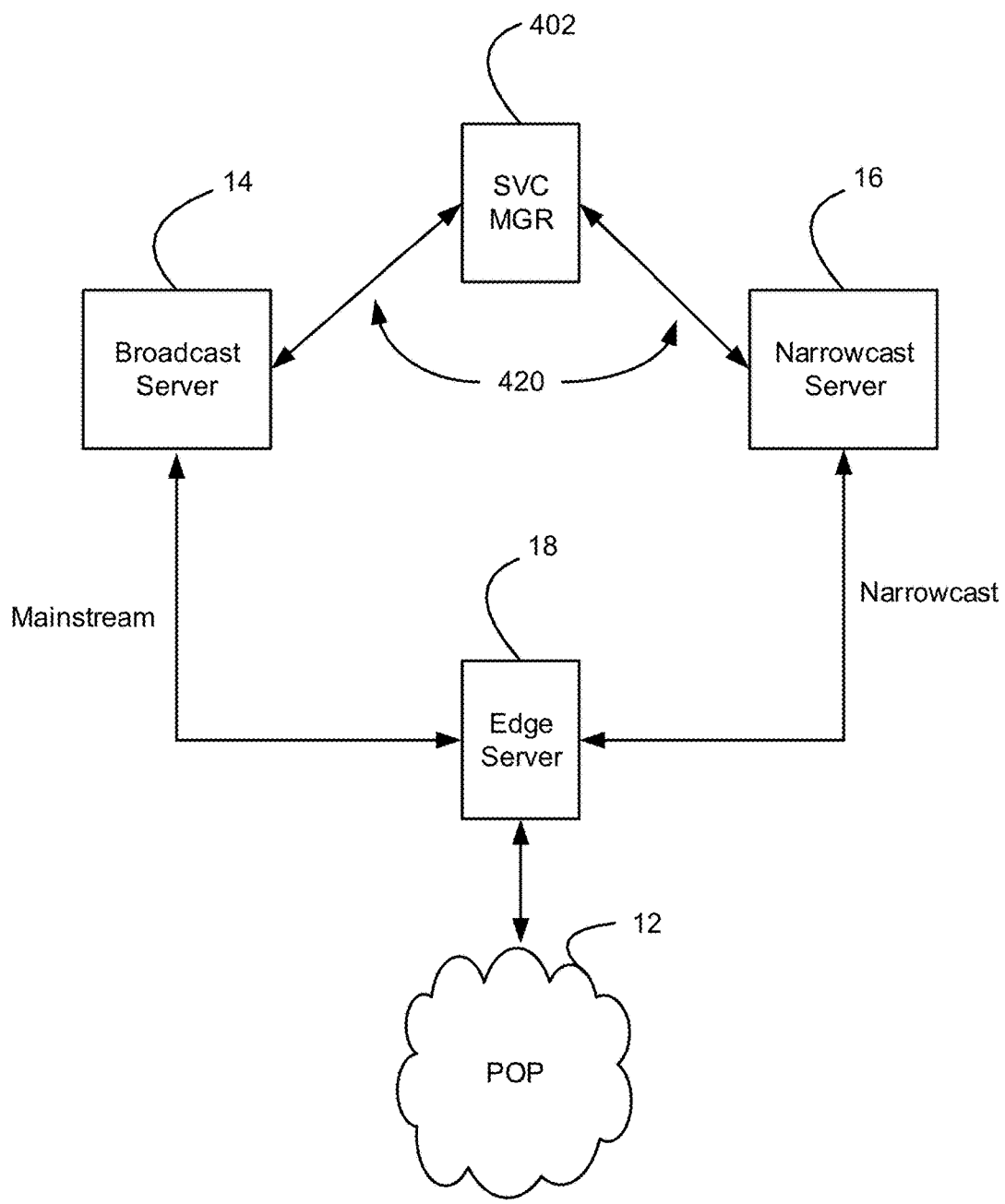
FIG. 4 is a block diagram illustrating a service manager system in accordance with one or more aspects of the disclosure.

FIG. 4 is a block diagram illustrating a system 400. In system 400, a service manager (SVC MGR) 402 may dynamically track, qualify, assign and/or execute assignment 420 (hereinafter referred to as "qualification") of content for service by a broadcast server 14 or a narrowcast server 16, such as for eventual access by one or more terminals corresponding to one or more users 20.

An initial assignment or qualification of channels and/or content may be made by one or more broadcast servers 14 and narrowcast servers 16. In some embodiments, the initial assignment or qualification may be based one or more factors or criteria, such as prior or static viewership data. Thereafter, when narrowcast content is detected to be accessed or active in greater than 'n' population pools, where n is a predetermined threshold for (temporary) qualification as broadcast content rather than as narrowcast content, the content may be qualified 420 by service manager 402 to the broadcast server 14, such as for a predetermined period of time. Conversely, with respect to the broadcast server 14, if a particular channel or content has a viewership of only 1, or n, population pools, such content (or channel) may be (re)qualified 420 to the narrowcast server 16 corresponding to the population pool (or n pools) in which the content is requested and/or active, such as for a predetermined time. Thereby, bandwidth of the broadcast server 14 may be conserved.

As used herein, the threshold n may differ for channels or content that may be qualified 420 from broadcast to narrowcast, versus channels or content that may be reviewed for qualification 420 from narrowcast to broadcast. The threshold n may allow for variability, such as +/−10%, to account for error fluctuation. In some embodiments, the threshold n may be 1, and no more than 1, for reassignment or requalification of a broadcast channel or content to narrowcast in which the 1 is requested. In some embodiments, the threshold n may be 5 population pools, that is, popularity across 5 narrowcast servers, for qualification 420 of narrowcast content or channels to broadcast.

Alternatively, or additionally, a more dynamic interpretation may be used in some embodiments. While the evaluation of a classification of narrowcast or broadcast may be based on popularity of content in the broadcast pool, content or channels may be reassigned or requalified from narrowcast to broadcast, or broadcast to narrowcast, responsive to numerous criteria, such as efficient bandwidth allocation or the popularity of content or channels serviced via narrowcast, for example. The reallocation of content or channels may further serve to maximize efficiency.

Qualification 420 may be performed by service manager 402. A predetermined time for which a qualification 420 may be maintained may include a permanent time, a predetermined time until an expiration time, or a predetermined time until an expiration event, such as a duration of a particular item of content. Thus, the predetermined time may be dependent upon predetermined timeframes, such as the length of certain content, a half hour, one hour, three hours, twenty-four hours, or the like, and/or may be dependent on events or occurrences relating to the subject of a content item, a channel associated with a content item, or similar factors.

Because bandwidth expenditure may be constant for mainstream content assigned or qualified to broadcast servers 14, and might be non-constant for content assigned or qualified to narrowcast servers 16, bandwidth may be conserved using dynamic assignment/qualification 420 by service manager 402 of content, such that only intermittent dedication of broadcast bandwidth may be used for particular, lesser-watched content. As such, a dynamic qualification 420 of content or a channel, such as a qualification based on a number of users requesting content or a channel at a given time, may conserve bandwidth.

Service manager 402 may be, for example, a server, node, or the like, and may have processing capabilities and communicative connections that provide for a tracking of usage of one or more channels and content items. In some embodiments, the tracking of usage may take place at a population pool level. In order to perform the processing discussed herein, service manager 402 may include, and/or have access to, one or more processors or microprocessors associated with one or more data storage mechanisms, such as computing memory, for storing, for example, the usage information discussed herein, and may further include computing code resident on the one or more microprocessors and/or the one or more data storage mechanisms. The computing code, when executed by the one or more processors, may cause the implementation of the systems and methods discussed herein, for example.

The communicative connections of service manager 402 may include one or more network connections, wherein the network connections provide for communications between one or more microprocessor-based computing systems. For the purposes of the disclosure, illustrative embodiments have been discussed with respect to a distribution network, and thus those skilled in the pertinent art will appreciate the applicability of the present disclosure to include communicative connections of service manager 402 via the Internet, an intranet, an extranet, a managed network, a cellular network, a satellite network, a television network, or the like, which connections may be present via wired or wireless technology.

In some embodiments, service manager 402 may be remotely accessible. In some embodiments, service manager 402 may be locally or remotely programmable via one or more available local or networked connections. Based on usage tracking that may be performed, service manager 402 may evaluate server group activity and qualify 420 or otherwise reassign channels or content between, for example, the narrowcast servers 16 and broadcast servers 14. In certain illustrative embodiments, evaluation logic that may be included in, or associated with, service manager 402 may ensure that content qualifications 420 do not adversely impact users or viewers. For example, service manager 402 may ensure that particular programs remain available, that system errors are not generated, that channel conflicts are avoided, and the like, for example.

In an example illustrated with reference to FIG. 4, n may be determined to be 1 population pool, for example. Service manager 402 may track usage by the population pools 12 of the broadcast content, and may detect four population pools 12 viewing content A at a given time. Because n equals 1 population pool in this example, service manager 402 may maintain qualification 420 of content A to the broadcast server 14 because four population pools 12 is greater than n=1 population pool.

Continuing the above example, with n equal to 1, if only 1 population pool is detected as viewing or otherwise accessing content A, content A may be qualified to the narrowcast server 16 for that pool. In other words, because the number of viewing pools of content A is equal to or less than n, service manager 402 may (re)assign or (re)qualify content A to the narrowcast server 16 of the pool viewing content A at that time.

In some embodiments, content may be precluded from reassignment or requalification (e.g., reassignment from broadcast to narrowcast, or vice versa). The preclusion may apply permanently, or may apply for a certain timeframe. In some embodiments, reassignment/requalification 420 may occur on paired channels or content, that is, if one particular channel or content item is reassigned or requalified from broadcast to narrowcast, a second channel or content item may correspondingly be reassigned or requalified from narrowcast to broadcast. Yet further, it will be appreciated that dynamic reassignment or requalification may occur based on n as a number of population pools, as a number of groups of multiple population pools, as a number of users, as a number of groups of users, or the like.

In one illustrative example, a particular sports channel or content item may be narrowcast. But, for example, in the event a famous, frequent winner of the Tour de France comes out of retirement to participate in the race, viewership demand may dictate that the particular sports channel or content item be reassigned or requalified to broadcast. Likewise, certain content, such as Major League Baseball games on a dedicated baseball channel, for example, may be more popular at certain times of year, such as during the fall baseball playoff race, and at such times of year should be broadcast. However, content on that same baseball dedicated channel may have little or no viewership during the winter months, for example. Thus, in some embodiments, content or channels may be reassigned or requalified to account for, or respond to, changes in anticipated or actual demand, optionally based on one or more events, the time of day, month, or year, etc.

The ability to reassign or requalify channels or content between servers, or tiers of servers, may help to manage bandwidth in portions or throughout a network. Further, dynamic assessment of the needs of particular population pools may provide for a reduction in equipment needed, in part because the equipment may be subject to dynamic bandwidth management.

Figure 5:
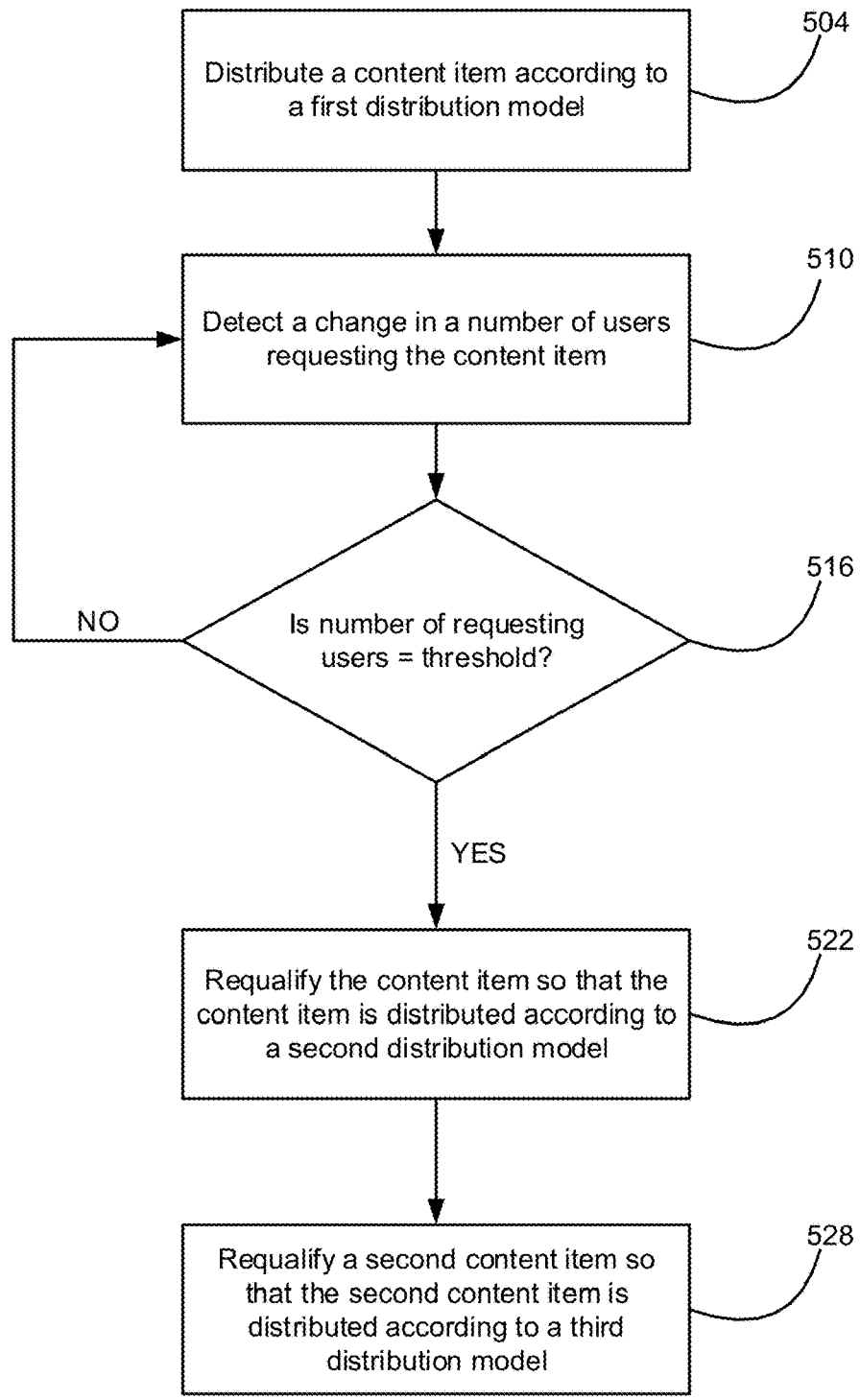
FIG. 5 illustrates a method suitable for demonstrating one or more aspects of this disclosure.

FIG. 5 illustrates a method that may be used to demonstrate one or more aspects of this disclosure. The method of FIG. 5 may be executed in connection with one or more operating environments or network architectures (e.g., the architectures shown in FIGS. 3-4).

In step 504, a content item (or a channel) may be distributed in accordance with a first distribution model. For example, the first distribution model may be a broadcast distribution model. The first distribution model may be selected by a content provider, a network provider, or one or more devices, such as service manager 402 of FIG. 4.

In step 510, a change may be detected in the number of users requesting the content item. For example, service manager 402 may monitor data corresponding to user requests or selections for content. In some embodiments, the frequency with which step 510 is executed may be a function of the resolution (e.g., a resolution to a network congestion issue) desired by a network or system operator or a content provider. For example, service manager 402 may be configured to execute step 510 periodically (e.g., once a day) so as to allow service manager 402 to tend to other tasks. In some embodiments, service manager 402 may be configured to execute step 510 continuously in order to provide a high degree of resolution (e.g., in order to provide a high degree of responsiveness). In some embodiments, service manager 402 may be configured to execute step 510 in connection with one or more events (e.g., a population pool having been added to or deleted from the coverage provided by service manager 402).

In step 516, a determination may be made whether a number of users requesting the content item is equal to a threshold. Continuing the above example where the content item is distributed (in step 504) according to a broadcast distribution model, if the number of users requesting the content item is detected to be equal to (or below) a threshold value, then the 'Yes' path out of step 516 may be taken to step 522. Conversely, if the number of users requesting the content item is above the threshold value, then the 'No' path may be taken out of step 516, and the operational flow may return to step 510.

In step 522, the distribution model associated with the content item may be requalified, such that the content item may be distributed according to a second distribution model. Continuing the above example, where the content item was distributed according to a broadcast model in connection with step 504, step 522 may include distributing the content item according to a narrowcast distribution model.

In some embodiments, step 528 may be executed to accommodate the requalification performed in connection with step 522. Continuing the above example, when the content item is requalified from a broadcast distribution model to the narrowcast distribution model in connection with step 522, a second content item may be requalified from the second distribution model (e.g., the narrowcast distribution model) to a third distribution model in step 528. In some embodiments, the third distribution model may be the first distribution model (e.g., the broadcast distribution model in this example) in order to facilitate one-to-one correspondence between requalified narrowcast content and requalified broadcast content as described herein.

In the example described above, a content item was requalified from a broadcast distribution model to a narrowcast distribution model based on a number of requesting users being equal to or less than a threshold value. The method of FIG. 5 may also accommodate other scenarios, such as requalifying a content item (or channel) from a narrowcast distribution model to a broadcast distribution model based on a number of requesting users being equal to or greater than a threshold value. Based on demand or other factors, a given content item or channel may be requalified any number of times, optionally using the same or different threshold values each time.

In some embodiments, hysteresis may be applied to the threshold value(s) used in order to avoid unnecessary or repetitive requalification. The hysteresis may be a function of time in some embodiments (e.g., a relatively large value for the hysteresis may be used initially, and the hysteresis may decline in terms of magnitude over time).

The method of FIG. 5 is illustrative. In some embodiments, one or more of the steps shown in FIG. 5 may be optional, and steps not shown may be included or added. Moreover, the order or sequence of steps may be modified in some embodiments.

Although not required, various aspects described herein may be embodied as a method, a data processing system, and/or as a transitory and/or non-transitory computer-readable medium storing executable instructions. Accordingly, those aspects may take the form of an entirely hardware embodiment, an entirely software embodiment, an entirely firmware embodiment, or an embodiment combining software, firmware and hardware aspects. The functionality may be resident in a single computing device, or may be distributed across multiple computing devices/platforms, the multiple computing devices/platforms optionally being connected to one another via one or more networks. Moreover, the structural components described herein may be distributed amongst one or more devices, optionally within a common housing or casing.

Various signals representing content, data, or events as described herein may be transferred between a source and a destination in the form of electromagnetic waves traveling through signal-conducting media such as metal wires, optical fibers, and/or wireless transmission media (e.g., air and/or space).

The various methods and acts may be operative across one or more computing servers and one or more networks. The functionality may be distributed in any manner, or may be located in a single computing device (e.g., a server, a client computer, etc.). As discussed herein, content may be distributed to intermediary/network components and client-side devices at various times and in various formats. The distribution and transmission techniques described herein may leverage existing components and infrastructure to minimize power dissipation, operational complexity, footprint size, and management involvement, amongst other factors and costs.

The methodological acts and processes may be tied to particular machines or apparatuses. For example, as described herein, content may distributed to a user location or user premises via one or more computing devices (e.g., servers) and that content may be accessed or displayed at the user location via one or more terminals and/or display devices. The content may be formatted in accordance with one or more transmission techniques, types, or protocols, such as broadcast and narrowcast and reassignment or requalification between the various techniques, types, or protocols may be facilitated based on one or more factors or criteria. More generally, one or more computers may include one or more processors and memory storing instructions, that when executed, perform the methodological acts and processes described herein. Furthermore, the methodological acts and processes described herein may perform a variety of functions including transforming an article (e.g., content distributed in accordance with a first distribution model, such as broadcast) into a different state or thing (e.g., content distributed in accordance with a second distribution model, such as narrowcast).

Those of ordinary skill in the art will recognize that many modifications and variations of this disclosure may be implemented without departing from the spirit or scope. Thus, it is intended that the disclosure cover the modifications and variations, provided they come within the scope of the appended claims and their equivalents.

The invention claimed is:

1. A method comprising:
   monitoring, by a computing device, data corresponding to content requests from one or more population pools;

determining, based on at least a first portion of the content requests, a first number of users requesting a content asset from a first server, wherein the content asset is initially assigned, based on historical viewership data, to a first content lineup available via the first server;

reassigning, based on the first number of users satisfying a first threshold, the content asset from the first content lineup available via the first server to a second content lineup available via a second server different from the first server, wherein the computing device causes the content asset to be available via the second server;

determining, based on at least a second portion of the content requests, a second number of users requesting the content asset from the second server; and reassigning, based on the second number of users satisfying a second threshold, the content asset from the second content lineup available via the second server to the first content lineup available via the first server, wherein the computing device causes the content asset to be available via the first server.

2. The method of claim 1, further comprising determining the first threshold and the second threshold based on one or more of:
whether the first server is associated with narrowcast content,
whether the second server is associated with broadcast content,
popularity of content from the first server, or
popularity of content from the second server.

3. The method of claim 1, further comprising:
reassigning, based on reassigning the content asset from the first content lineup to the second content lineup, a second content asset from the second content lineup to the first content lineup.

4. The method of claim 1, wherein the reassigning the content asset from the first content lineup available via the first server to the second content lineup available via the second server causes the content asset to be unavailable from the first server.

5. The method of claim 1, wherein the monitoring occurs continuously in real time.

6. The method of claim 1, wherein the monitoring the data corresponding to the content requests from the one or more population pools comprises monitoring a variation of a number of users requesting the content asset from the first server or the second server.

7. The method of claim 1, wherein the reassigning the content asset from the first content lineup available via the first server to the second content lineup available via the second server is further based on an anticipated demand for the content asset.

8. The method of claim 1, wherein the reassigning the content asset from the first content lineup available via the first server to the second content lineup available via the second server is further based on one or more time periods in which popular events are broadcasted.

9. An apparatus comprising:
one or more processors; and
memory storing instructions that, when executed by the one or more processors, cause the apparatus to:
assign, based on historical viewership data and to a first content lineup available via a first server, a content asset;
monitor data corresponding to content requests from one or more population pools;
determine, based on at least a first portion of the content requests, a first number of users requesting the content asset from the first server;
reassign, based on the first number of users satisfying a first threshold, the content asset from the first content lineup available via the first server to a second content lineup available via a second server different from the first server;
cause the content asset to be available via the second server;
determine, based on at least a second portion of the content requests, a second number of users requesting the content asset from the second server;
reassign, based on the second number of users satisfying a second threshold, the content asset from the second content lineup available via the second server to the first content lineup available via the first server; and
cause the content asset to be available via the first server.

10. The apparatus of claim 9, wherein the instructions, when executed by the one or more processors, further cause the apparatus to determine the first threshold and the second threshold based on one or more of:
whether the first server is associated with narrowcast content,
whether the second server is associated with broadcast content,
popularity of content from the first server, or
popularity of content from the second server.

11. The apparatus of claim 9, wherein the instructions, when executed by the one or more processors, further cause the apparatus to:
reassign, based on reassigning the content asset from the first content lineup to the second content lineup, a second content asset from the second content lineup to the first content lineup.

12. The apparatus of claim 9, wherein the instructions, when executed by the one or more processors, further cause the apparatus to:
cause, based on reassigning the content asset from the first content lineup available via the first server to the second content lineup available via the second server, the content asset to be unavailable from the first server.

13. The apparatus of claim 9, wherein the instructions, when executed by the one or more processors, cause the apparatus to monitor the data by monitoring the data continuously in real time.

14. The apparatus of claim 9, wherein the instructions, when executed by the one or more processors, further cause the apparatus to:
monitor an anticipated or actual demand for the content asset.

15. The apparatus of claim 9, wherein the instructions, when executed by the one or more processors, further cause the apparatus to:
determine, based on one or more time periods in which popular events are broadcasted, one or more changes in an anticipated or actual demand for the content asset.

16. A system comprising:
a first server comprising:
one or more first processors; and
first memory storing first instructions that, when executed by the one or more first processors, cause the first server to:
store a first content lineup;

a second server comprising:
  one or more second processors; and
  second memory storing second instructions that, when executed by the one or more second processors, cause the second server to:
    store a second content lineup; and
a computing device comprising:
  one or more third processors; and
  third memory storing third instructions that, when executed, cause the computing device to:
    monitor data corresponding to content requests from one or more population pools;
    determine, based on at least a first portion of the content requests, a first number of users requesting a first content asset from the first content lineup;
    reassign, based on the first number of users satisfying a first threshold, the first content asset from the first content lineup to the second content lineup;
    determine, based on at least a second portion of the content requests, a second number of users requesting the first content asset from the second content lineup; and
    reassign, based on the second number of users satisfying a second threshold, the first content asset from the second content lineup to the first content lineup.

17. The system of claim 16, wherein the third instructions, when executed by the one or more third processors, further cause the computing device to determine the first threshold and the second threshold based on one or more of:
  whether the first server is associated with narrowcast content,
  whether the second server is associated with broadcast content,
  popularity of content from the first server, or
  popularity of content from the second server.

18. The system of claim 16, wherein the third instructions, when executed by the one or more third processors, further cause the computing device to:
  reassign, based on reassigning the first content asset from the first content lineup to the second content lineup, a second content asset from the second content lineup to the first content lineup.

19. The system of claim 16, wherein the third instructions, when executed by the one or more third processors, further cause the computing device to:
  cause, based on reassigning the first content asset from the first content lineup to the second content lineup, the first content asset to be unavailable from the first server.

20. The system of claim 16, wherein the third instructions, when executed by the one or more third processors, further cause the computing device to:
  monitor the data corresponding to the content requests from the one or more population pools continuously in real time.

* * * * *

UNITED STATES PATENT AND TRADEMARK OFFICE
CERTIFICATE OF CORRECTION

PATENT NO. : 10,433,013 B2  
APPLICATION NO. : 15/845804  
DATED : October 1, 2019  
INVENTOR(S) : Amit Garg and Tom Brown Page 1 of 1

It is certified that error appears in the above-identified patent and that said Letters Patent is hereby corrected as shown below:

In the Specification

Detailed Description, Column 4, Line 27:
Please delete "HTMLS," and insert --HTML5,--

Signed and Sealed this
Sixth Day of December, 2022

Katherine Kelly Vidal
*Director of the United States Patent and Trademark Office*